Jan. 2, 1973    G. E. KISTNER    3,708,375
ADHESIVE BANDAGE AND APPARATUS FOR
MANUFACTURE OF SAME
Filed March 10, 1969    4 Sheets-Sheet 1
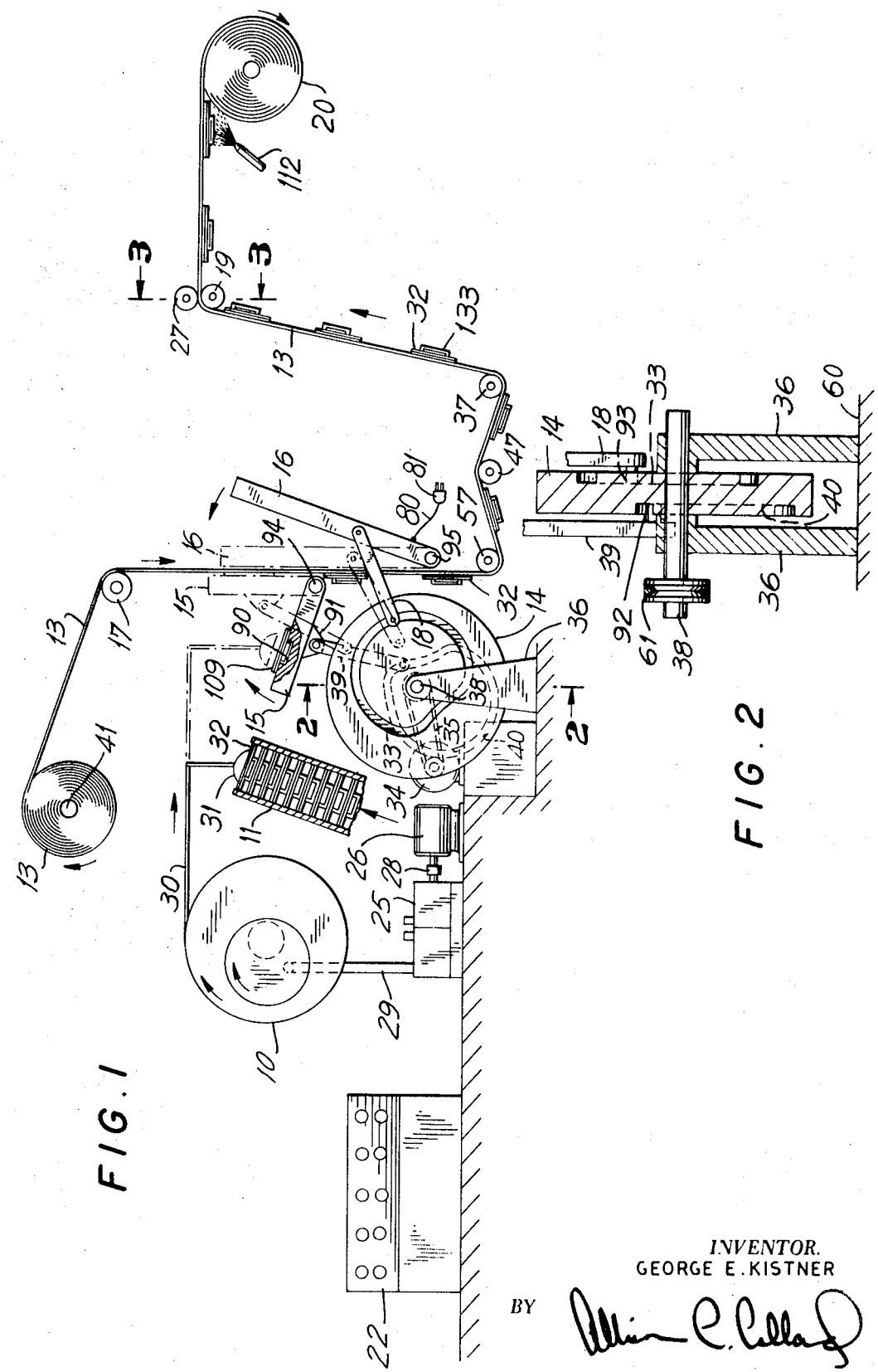
INVENTOR.
GEORGE E. KISTNER
BY

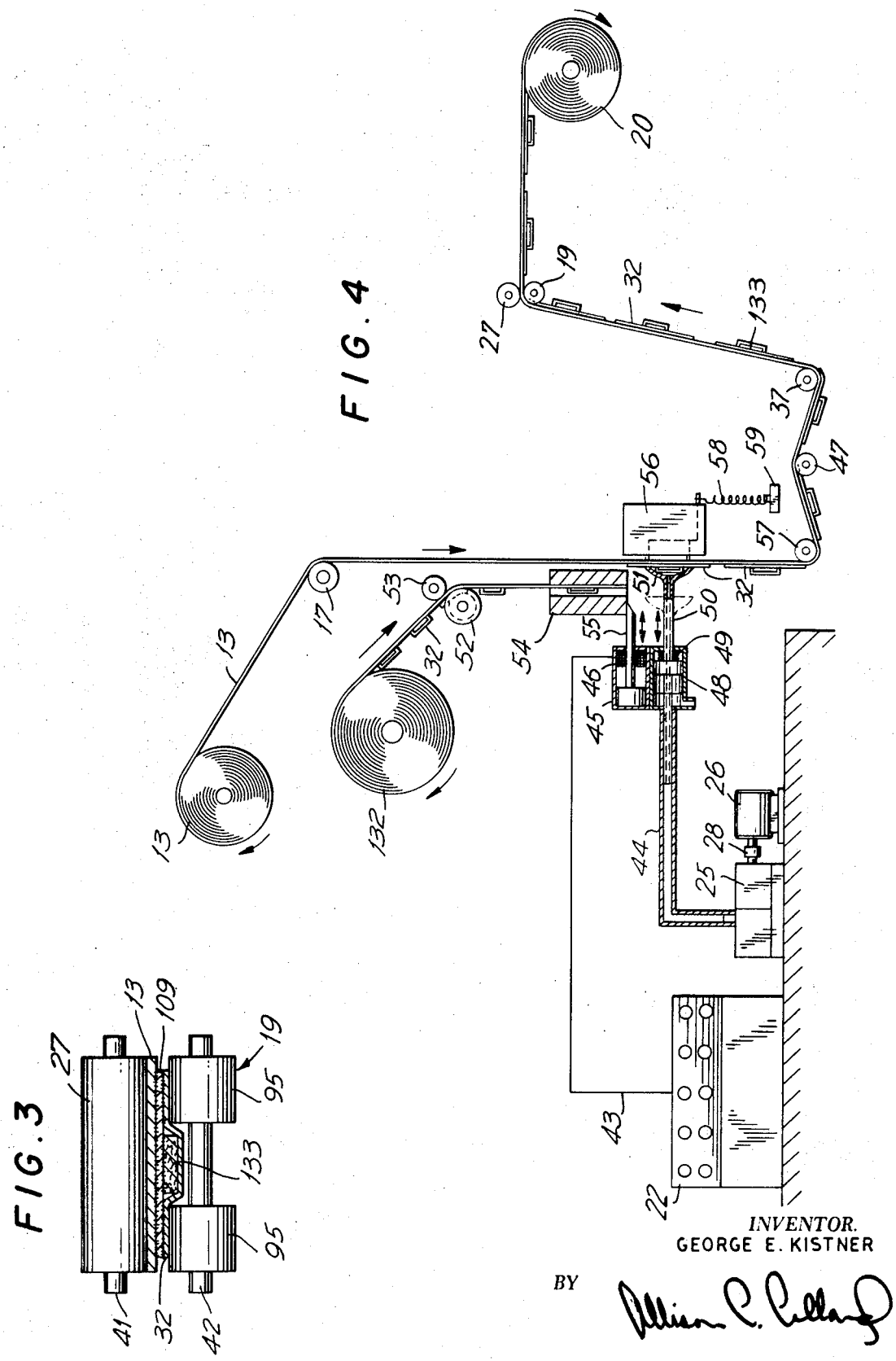

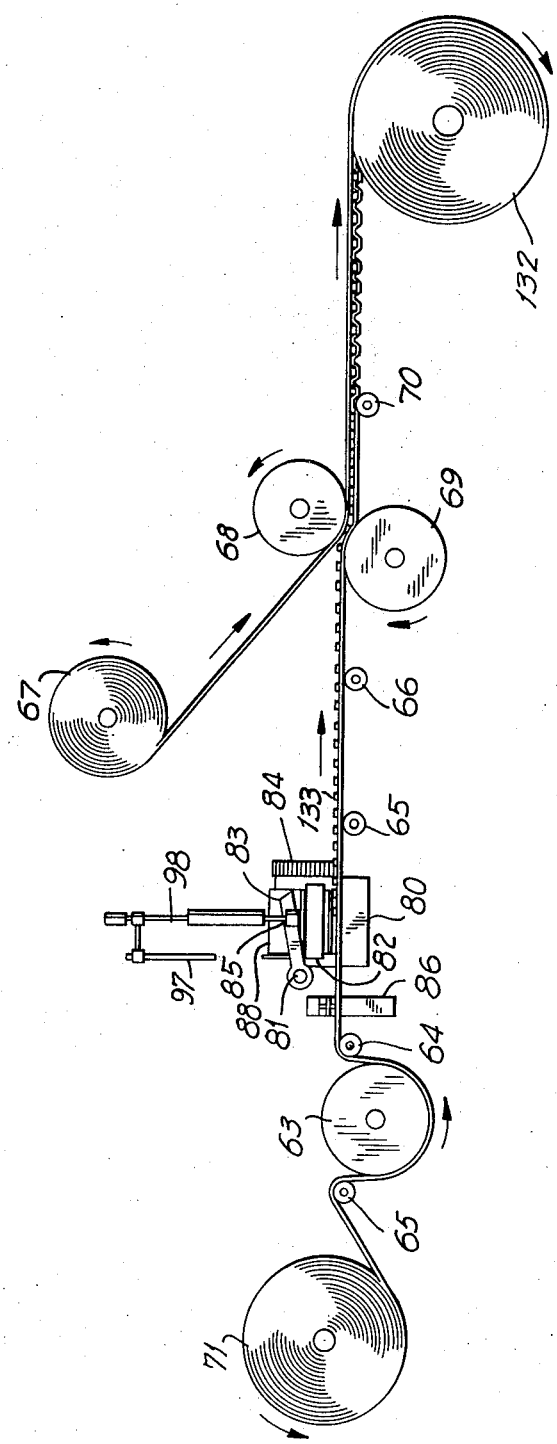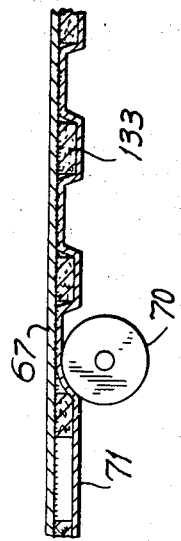

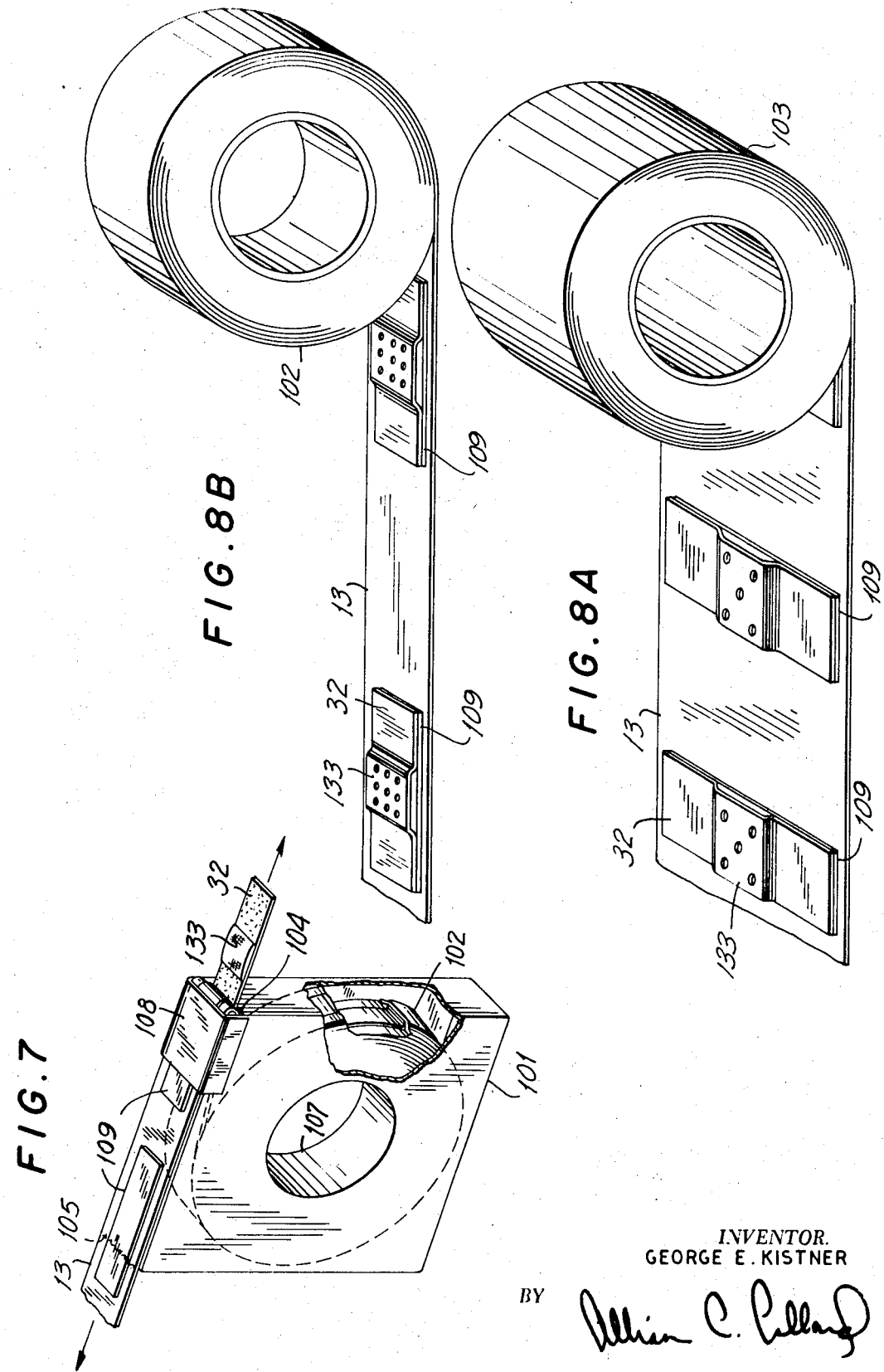
Jan. 2, 1973     G. E. KISTNER     3,708,375
ADHESIVE BANDAGE AND APPARATUS FOR MANUFACTURE OF SAME
Filed March 10, 1969     4 Sheets-Sheet 4
INVENTOR.
GEORGE E. KISTNER United States Patent Office 3,708,375
Patented Jan. 2, 1973

3,708,375
ADHESIVE BANDAGE AND APPARATUS FOR
MANUFACTURE OF SAME
George E. Kistner, 31 Grafton St.,
Greenlawn, N.Y. 11740
Filed Mar. 10, 1969, Ser. No. 805,522
Int. Cl. B32b 31/20, 31/10
U.S. Cl. 156—552
2 Claims

ABSTRACT OF THE DISCLOSURE

An apparatus for applying adhesive bandages to a continuous adhesive substrate from either a hopper or a continuous roll of bandages consisting of, in one embodiment, a first platen for applying bandages to the adhesive surface of the substrate and a second platen simultaneously activated with the first platen for applying heat to the substrate to activate its adhesive surface so that the bandage will be adhered thereto. In another embodiment, a moving knife slices individual bandages from a continuous roll so that a suction cup can press the bandages onto the adhesive surface of the substrate.

The present invention relates to surgical dressings, and more specifically, to adhesive bandages of the type widely used for example, in the first-aid treatment of superficial lesions of the skin.

The United States Pharmacopoeia defines an adhesive bandage as "a sterile individual dressing prepared by affixing a plain absorbent compress to a strip of film or fabric coated with a pressure sensitive adhesive composition." The absorbent compress or pad, and exposed adhesive surfaces are covered by overlapping strips of a protective backing material of a width not less than that of the dressing, and are defined as facings or facing members. These facing members are intended to be removed prior to the application of the bandage to the skin. The U.S. Pharmacopeia further requires that each bandage be packaged individually in such a manner that its sterility is maintained until the individual package is opened. To meet these requirements, the manufacturer of adhesive bandages must first place each bandage in the prescribed package and thereafter sterilize the entire package. The manufacturer must carefully control the sterilizing conditions to which the package is subjected so as not to damage the components of the adhesive bandage. Under sterilization, for example, the facing material or adhesive mass may radically change its dimensions due to relaxation of internal stresses. The backing film or facing material may also tend to transfer from one layer to the other so as to alter the various components of the bandage.

Conventional adhesive bandages which are packaged under these techniques to meet sterilization requirements often require greater time and effort to remove their outer wrappings and facing members for quick application to a skin lesion. These conventional adhesive bandages are individually contained in sealed packages, the removal of which is not easily accomplished with great speed. These conventional bandages often require both hands of the user in order to prepare for application to the skin.

Accordingly, the present invention provides an apparatus for manufacturing individually packaged adhesive bandages which meet sterility requirements and permit rapid application of the bandage by the user. The apparatus, according to the present invention, takes adhesive bandages with their facings which are either contained on a roll, or disposed in a hopper, and applies them at spaced apart intervals on a silicon release material in a continuous process. The apparatus includes a platen which heat seals the facing side of the adhesive bandages to the release material along a continuous web. The bandages on the web are then sterilized by applying either mercuric oxide, live steam or heat to the web. After sterilization takes place, the heat seal material or substrate is then reactivated as the web is collected in a roll so as to encapsulate the bandages and their facing members between layers in the roll. This process forms individually sealed capsules of sterilized adhesive bandages which are sealed within the body of the roll. The roll can then be sized and placed in a dispenser so that the adhesive bandages can be individually removed without their facing members as needed and quickly applied to skin lesions.

It is therefore an object according to the present invention to provide a method and apparatus for manufacturing adhesive bandages which can be dispensed for quick application by the user to superficial lesions of the skin.

It is a further object of the present invention to provide a method and apparatus for manufacturing adhesive bandages which attach the bandages at registered distances to a continuous roll to form a sterilized capsule for rapid dispensing by the user.

It is still a further object according to the present invention to provide a method and apparatus for the production of adhesive bandages on a dispensing roll which is simple in design, easy to construct and inexpensive to operate.

Other objects and features of the present invention will become apparent from the following detailed description considered in connection with the accompanying drawings. It is to be understood, however, that the drawings are designed for the purpose of illustration only, and not as a definition of the limits of the invention, as to which reference should be made to the appended claims.

In the drawings, wherein similar reference characters denote similar elements throughout the several views:

FIG. 1 discloses one embodiment of the apparatus according to the invention for applying adhesive bandages from a hopper to a continuous web by means of a heat producing platen;

FIG. 2 is a cross-sectional view taken along line 2—2 of FIG. 1;

FIG. 3 is a cross-sectional view taken along line 3—3 of FIG. 1;

FIG. 4 discloses another embodiment of the invention for heat sealing bandages from a bandage roll to a continuous web for sterilization and dispensing;

FIG. 5 discloses a further embodiment of the present invention for manufacturing adhesive bandages with facing members in a continuous process;

FIG. 6 is a detailed cross-sectional view of a portion of the apparatus of FIG. 5;

FIG. 7 is a perspective view of a dispenser, partly in cross-section, for rapidly dispensing bandages from individual rolls formed on the apparatus of FIGS. 1 and 4; and FIGS. 8A and 8B are perspective views of adhesive bandages mounted in series on roll strips laterally and longitudinally, respectively.

Referring to FIGS. 1, 2 and 3, there is shown one embodiment of the apparatus of the present invention for applying already prepared adhesive bandages 32 from a hopper 11 to a heat sealed substrate 13 which is dispensed from a roll pivotably mounted on axis 41. The supply roll of heat sealed substrate 13 is fed over roller 17 to guide roller 57 for tensioning over compensating roller 47. Substrate 13 is further wound over guide roller 37, for movement into a pair of compensating rollers before being collected by take-up roll 20.

The apparatus further includes an eccentric cam 10 having a pneumatic vacuum arm 30 which contains a suction cup 31 on its extending ends, for removing the already prepared adhesive bandages 32 from a hopper 11. Hopper 11 is adjustable so as to advance adhesive bandages 32 consecutively upward in a well-known conventional manner for contact with suction cup 31. Eccentric cam 10 is connected to a vacuum pump 25 by means of vacuum line 29. Vacuum pump 25 is driven by motor 26 through output shaft 28, and provides a vacuum through line 29 to vacuum arm 30 so that when eccentric cam 10 is rotated by a continuous drive motor (not shown), vacuum arm 30 will advance suction cup 31 with an adhesive bandage 32 with its facing members to position as shown in dotted line. At this position, the vacuum in arm 30 will be terminated so that suction cup 31 will release adhesive bandage 32 onto the face of a first platen 15. Platen 15 includes a depression 90, cut into its top face for receiving the absorbent pad of bandage 32, while the facing member 109 of bandage 32 spreads across the face of the platen.

The backside of platen 15 includes a bracket 91 for pivotably mounting a lever arm 39. The opposite end of lever arm 39 includes a cam 92 which rides in a camming surface 40 contained in a cam wheel 14. Cam wheel 14 is pivotably supported on axle 38 by means of spaced apart brackets 36, and is driven by means of motor 34 connected through belt 35 to pulley 61 secured on one end of shaft 38. Platen 15 is pivotably secured by means of axis 94 adjacent to substrate 13 between guide pulleys 17 and 57, so that when cam wheel 14 is rotated, cam surface 40 and lever 39 advance the top face of platen 15, containing adhesive bandage 32, against substrate 13.

Cam wheel 14 includes an additional camming surface 33 in its opposite face for receiving cam 93 connected to the end of lever 18. The opposite end of lever 18 is pivotably connected to the side of a second platen 16 positioned on the opposite side of substrate 13. Platen 16 includes internal electrical heaters (not shown) which are powered through conductor 80 to an electrical power source 81. Camming surfaces 33 and 40, on wheel 14, are arranged to advance platens 15 and 16 simultaneously against the front and back surfaces of substrate 13. The heat applied by platen 16 against the backside of substrate 13 will activate its adhesive on the front side so that bandage 32 on platen 15 will adhere to its tacky front surface. After platens 15 and 16 are released from their dotted line positions by the further rotation of cam wheel 14, a hysteresis motor connected to the shaft to take up roller 20 will advance substrate 13 an additional interval to accommodate the placement of the next adhesive bandage. While substrate 13 is advanced to the next position, eccentric cam 10 will advance vacuum arm 30 to deposit an additional bandage 32 onto the open face of platen 15 in preparation for the next cycle of operation. Adhesive bandages 32 will advance around guide roller 57, over compensating roller 47, and around guide roller 37 for passing between rollers 19 and 27 located adjacent to take-up roller 20. Roller 19 as shown in detail in FIG. 3 consists of two enlarged spaced-apart hubs 95 which are trunnioned on shaft 42. Hubs 95 are spaced-apart on shaft 42 to accommodate the enlarged thickness of the absorbent compress or pad 133 of bandage 32 which is enclosed by facing member 109. Guide roller 27 mounted on shaft 41 is urged against roller 19 to further press substrate 13 against the backside of bandage 32 prior to its collection by roller 20.

Substrate 13 may consist of a megascopically homogeneous film which is not tacky at room temperature but can be activated to an adhesive by the application of heat. It may consist of a resin of potentially viscid polymeric material and another potential plasticizer present in the form of discrete crystalline particles present in the film to form a plastisol adhesive when it is heated. Typical formulas for this heat film covering for substrate 13 may consist of the following:

(A) Indene resin, 50 parts; ethylcellulose, 10 parts; diphenyl phthalate, 40 parts; ethyl alcohol, 200 parts.

(B) Versamid #940, 85 parts, Staybelite ester #10, 5 parts; tributyl phosphate or dibutyl phthalate, 10 parts.

This homogeneous film may then be coated onto a 30 lb. high density natural kraft release paper having a neutral base coated with Dow Silloff and an FDA approved catalyst. The above described film could also be applied upon ½ mil thickness polyester Mylar containing the Dow Silloff coating and the FDA approved catalyst.

A sterilizing jet 112 may also be provided adjacent to collection roll 20 and directed at the adhesive side of substrate 13 to sterilize bandages 32, and reactivate the adhesive of substrate 13 to seal and encapsulate bandages 32 within the coils of roll 20. Sterilizing jet 112 can spray steam or mercuric oxide to sterilize bandages 32. Jet 112 may not be required if roll 20 is immersed in a heated sterilizing bath after it is removed from the apparatus of FIG. 1. A control panel 22 is mounted adjacent to eccentric cam 10 for controlling the advancement of substrate 13 between platens 15 and 16, and the speed of operation of the machinery. If substrate 13 consists of a 30" wide web, and bandages 32 are to be placed on the web longitudinally, then the apparatus of FIGS. 1–3 would include 24 hoppers 11, and 24 vacuum arms 30 for the simultaneous placement of 24 bandages onto the web. For a lateral attachment of the bandages, it is anticipated that only eight adjustable hoppers 11 and pneumatic arms 30 will be required. With an average web speed of approximately 4 feet per minute, it is anticipated that the apparatus of FIGS. 1–3 under a multiple set-up as described above would produce from between 8000 to 24,000 encapsulated bandages per hour. After collection roll 20 is removed from the apparatus, it may be sheared into 8 or 24 sections to produce single rolls having single columns of bandages. These individual rolls can then be separated into smaller rolls containing 50 and 100 bandages each for insertion into a dispenser for easy removal and fast application by the user.

FIG. 4 discloses another embodiment of the invention for the transfer of adhesive bandages from a continuous bandage roll 132 on to substrate 13. Adhesive bandages 32 which are dispensed from continuous roll 132 are fed between guide rollers 52 and 53 into shearing guide block 54, for shearing by a pneumatic knife 55. Knife 55 is connected on the armature of a solenoid 45, and moves in response to a signal from panel 22, through conductor 43 to coil 46 of the solenoid. A return spring (not shown) will return knife 55 to its rest position after the solenoid is operated. Knife 55 is positioned to slide across the gap of guide block 54 to shear bandage sections 32 from roll 132. Below guide block 54 is disposed a sliding plunger 51 secured on the end of hollow shaft 50 coupled to cylinder 48. Cylinder 48 is connected through to tube 44 to vacuum pump 25. A solenoid coil 49 is also provided within cylinder 48 and connected to panel 22 (not shown), to advance vacuum plunger 51 holding the sheared bandage 32, against the surface of substrate 13. On the backside of substrate 13, opposite plunger 15 is positioned an electric heating block 56 which is electrically connected through conductors 58 to electric power source 59. When bandages 32 are dispensed from continuous roll 132, through guide block 54, vacuum plunger 51 in its dotted line position holds bandage 32 in place while knife 55 is activated by means of solenoid 46 to shear the individual bandage from its continuous roll. While knife 55 returns to its initial state, plunger 51 advances the facing member side of bandage 32 against the front surface of substrate 13 and pushes the back surface against heat block 56 to activate the adhesive on the front surface. The facing member of bandage 32 will then stick to the substrate so that when plunger 51 is withdrawn, substrate 13 can then be advanced an additional space by means of take-up roll 20 to accommodate the next cycle of operation. Solenoids 46 and 49 which advance knife 55 and plunger 51 respectively, are controlled by means of control panel 22 so as to operate at the beginning of each cycle, after take-up roll 20 advances substrate 13 to a new position.

Referring to FIGS. 5 and 6, there is shown a modification of a prior art device for the manufacture of a continuous roll of adhesive bandages 132 and utilized in the apparatus of FIG. 4. A roll of adhesive material 71 passes over guide roller 65 under a drum 63, and over a roller 64, to pass through a perforating device 86, and over a bed 80 above a mechanism for performing cutting and applying gauze pads or absorbant material to the surface of adhesive 71. Perforating device 86 produces a pattern of perforation in the adhesive so that a gauze pad 133 can subsequently be placed over the perforations. A gear 84 advances feed roller 88 to move a gauze strip (not shown) underneath a reciprocating knife blade 83. Knife 83 which reciprocates on axis 81 over cutting block 82 cuts distinct sections of gauze pads from the continuous gauze strip so that a suction head 85 which is secured to the end of a vacuum line 98 can apply each of the pad sections downward onto adhesive strips 71 as the strip is advanced to a new space. A source of vacuum can be connected to vacuum pipe 97 connected at the end of vacuum line 98. The adhesive strips 71 containing gauze pads 133 is then advanced over guide rollers 65 and 66 to pass between drums 68 and 69. The facing material is fed from rolls 67 between drums 68 and 69 so as to protect the adhesive during storage. A feed roller 70 is also provided to further compress the protective facing material 67 against adhesive 71 before the bandages are collected by roll 132.

FIG. 7 discloses one possible type of bandage dispensing apparatus 101 which can be used to dispense the bandages for quick application. Apparatus 101 contains a roll of bandages 102 which are dispensed out of a lot 104 at the top edge of one side. Substrate 13 is not bent backward across the top of the dispenser to slide through a metal guide 108, and pass over a cutting edge 105 secured to the opposite side of the top surface. The sharp bend in the substrate, adjacent to slot 104 causes bandages 32 to separate from its facing material 109 to expose its adhesive surfaces. The facing remains adhered to substrate 13 and is carried across the top of the dispenser. Dispenser 101 may be constructed as a portable, throw-away item for use by doctors and hospitals, or may be mounted against a wall for accessibility.

FIG. 8A is detailed perspective view of portion of roll 102 used in dispenser 101 showing individual spaced-apart bandages 32 having their facings 109 removably secured to the adhesive surface of the substrate in a lateral position. FIG. 8B is a detail view of another embodiment of a bandage roll 102 wherein the facings 109 of adhesive bandages 32 are longitudinally secured to adhesive substrate 13 for use in a dispenser similar to that shown in FIG. 7. The adhesive bandages are spaced apart on the embodiments shown in FIGS. 8A and 8B so that after dispenser 101 has produced an adhesive bandage as shown in FIG. 7, which has become attached from substrate 13, the next bandage to be dispensed remains sealed in roll 102 or 103 so that it cannot be contaminated until it is ready for use. When the next bandage is to be dispensed, the user will pull on the free end of substrate 13 causing that portion of the substrate containing the next bandage to break loose from its adjoining substrate portion for travel through slot 104. In this manner, individual bandages remain sealed against contamination within rolls 102 or 103 until they are ready for use.

While only a few embodiments of the present invention have been shown and described, it will be understood that many changes and modifications may be made thereunto without departing from the spirit and scope of the invention.

What is claimed is:
1. Apparatus for applying surgical dressings to a continuous substrate having a heat-activated adhesive surface, comprising:
a supply roller, upon which the substrate is wound, for supplying the substrate to the apparatus;
a plurality of guide rollers, for guiding the substrate through the apparatus during the application of the surgical dressings to the substrate;
a supply hopper, in which the surgical dressings are disposed, mounted on the apparatus adjacent one side of the substrate;
at least one horizontally movable pneumatic vacuum arm, having a downwardly disposed suction cup affixed to its end;
a first eccentric cam, coupled to said arm, for horizontally reciprocating said arm and said suction cup;
a vacuum pump, coupled to said arm, for providing a suction force in said suction cup to remove said surgical dressings individually from said supply hopper;
a first platen, pivotably mounted at one end to the apparatus adjacent said substrate and said supply hopper, and having a recess provided in one surface thereof for receiving a pad provided on each of the surgical dressings;
a second eccentric cam having a first cam surface provided on one side thereof and a second cam surface provided on the other side thereof, including a first elongated rod, pivotably coupled to said first platen, and a cam follower disposed on said rod, for engaging one of said cam surfaces and pivoting said first platen in response to movement of said eccentric cam;
a second platen, pivotably secured at one end on the apparatus, and coupled to said second eccentric cam, said second eccentric cam further comprising a second elongated rod coupled to said second platen, and a cam follower mounted on said second rod for engaging the other of said cam surfaces on said second eccentric cam and pivoting said second platen simultaneously with said first platen, so that said first and second platens simultaneously engage the front and back surfaces of the substrate, thereby applying said surgical dressings thereto, said second platen further comprising electrical heating means disposed therein for activating the adhesive on the substrate and securing the surgical dressings;
a take-up roller, rotatably mounted on the apparatus, for receiving the continuous substrate with the surgical dressings applied thereto; and
a sterilizing nozzle, disposed adjacent said substrate and said take-up roller, for spraying a sterilizing fluid on said substrate and said surgical dressings before the substrate is received by said take-up roller.
2. Apparatus for applying surgical dressings to a continuous substrate having a heat-activated adhesive surface, comprising:
a continuous supply roll of surgical dressings, positioned adjacent to one side of the substrate;
a guide block, disposed adjacent the end of said continuous supply roll, having a longitudinal aperture provided therein for receiving said continuous supply roll of surgical dressings;
a spring-loaded shearing knife, movable back and forth horizontally adjacent one end of said guide block, for cutting individual surgical dressings from said continuous supply roll;
a first solenoid, disposed about the longitudinal axis of said shearing knife, for moving said shearing knife horizontally back and forth;
at least one movable suction cup, mounted on one end of a spring-loaded cylindrical rod, and having a slidable plunger affixed to the other end thereof, dis- posed within a cylindrical housing, for receiving said surgical dressings from said shearing knife and advancing said ressings onto and against one face of the substrate;

a second solenoid, disposed about said spring-loaded cylindrical rod, for slidably moving said rod and said suction cup horizontally back and forth adjacent said substrate;

a vacuum source, coupled to said suction cup, for securing surgical dressings severed from said supply roll to said suction cup; and a heating block, disposed adjacent the back surface of said substrate for applying heat thereto and thereby activating said adhesive surface when said surgical dressings are advanced against the substrate.

References Cited
UNITED STATES PATENTS

| 2,642,116 | 6/1953 | Fisher et al. | 156—518 |
| 1,995,077 | 3/1935 | Perryman | 156—518 X |
| 2,033,553 | 3/1936 | Scholl | 156—518 X |
| 2,543,220 | 2/1951 | Ardell | 156—521 |
| 2,720,994 | 10/1955 | Arvidson | 156—517 |
| 2,722,332 | 11/1955 | Carter | 156—571 |
| 2,794,479 | 6/1957 | Ganz | 156—552 X |

BENJAMIN A. BORCHELT, Primary Examiner

J. M. HANLEY, Assistant Examiner

U.S. Cl. X.R.

156—267, 518, 572